United States Patent [19]

Aoki et al.

[11] Patent Number: 4,696,383
[45] Date of Patent: Sep. 29, 1987

[54] HYDRAULIC CLUTCH FOR MOTOR VEHICLES, HAVING CREEP-INHIBITING FEATURE

[75] Inventors: Takashi Aoki, Fujimi; Yukihiro Fukuda, Asaka; Masao Nishikawa, Nerima, all of Japan

[73] Assignee: Honda Giken Kogyo K.K., Tokyo, Japan

[21] Appl. No.: 755,068

[22] Filed: Jul. 15, 1985

[51] Int. Cl.[4] .................. F16D 13/72; F16D 25/061; F16D 25/14

[52] U.S. Cl. .......................... 192/70.12; 192/85 AA; 192/113 B

[58] Field of Search ........... 192/70.12, 85 AA, 113 B, 192/106 F

[56] References Cited

U.S. PATENT DOCUMENTS

| | | | |
|---|---|---|---|
| 2,642,844 | 6/1953 | Flinn | 192/85 AA X |
| 2,837,192 | 6/1958 | Dunkelow | 192/85 AA |
| 3,064,780 | 11/1962 | Richards et al. | 192/106 F |
| 3,677,381 | 7/1972 | Takagi et al. | 192/106 F |
| 4,271,951 | 6/1981 | Nishimura et al. | 192/85 AA X |
| 4,513,638 | 4/1985 | Nishikawa et al. | 192/3.58 X |

Primary Examiner—Rodney H. Bonck
Assistant Examiner—Richard M. Lorence
Attorney, Agent, or Firm—Arthur L. Lessler

[57] ABSTRACT

A frictionally engaging device for power transmission of a vehicle, has a first pressure chamber defined in part by one side of a piston urging frictionally engaging elements into engagement with each other, and a second pressure chamber defined in part by the other side of the piston for accommodating the frictionally engaging elements. A hydraulic pressure control arrangement controls operating fluid pressure supplied to the first pressure chamber at least to a value higher than a first predetermined value which causes engagement of the frictionally engaging elements and to a second predetermined value lower than the first predetermined value, which inhibits creeping of the frictionally engaging elements. When the operating fluid pressure is lower than the second predetermined value, a first valve opens to allow escape of the operating fluid from the second pressure chamber to the first pressure chamber. When the operating fluid pressure is at least lower than the first predetermined value, a second valve opens to permit flow of the operating fluid from the first pressure chamber to the second pressure chamber, to thereby cool the frictionally engaging elements.

2 Claims, 7 Drawing Figures

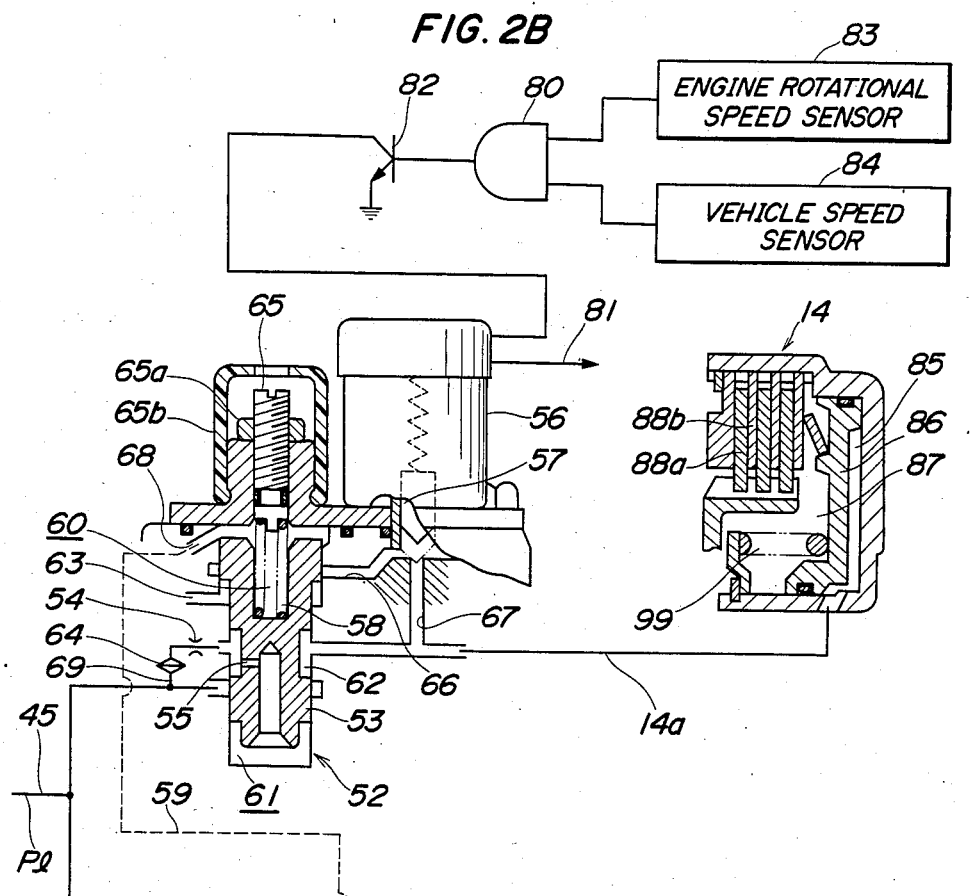
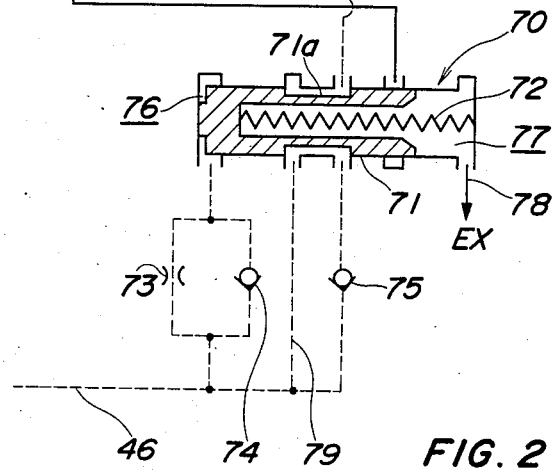
FIG. 2B
FIG. 2
| FIG.2A | FIG.2B |

HYDRAULIC CLUTCH FOR MOTOR VEHICLES, HAVING CREEP-INHIBITING FEATURE

BACKGROUND OF THE INVENTION

This invention relates to a frictionally engaging device for power transmission of an automotive vehicle, and more particularly to a frictionally engaging device of this kind which is applied to a transmission of a multistage type with a plurality of gear ratios or a transmission of an infinitely variable speed type having a fluid coupling such as a torque converter as well as a creep-inhibiting device, and which has a function of cooling the frictionally engaging elements thereof.

Creep-inhibiting devices, which are generally known, are classified into two types, one of which is adapted to bring the transmission into a neutral position to interrupt the power transmission between the engine and the driving wheels of the vehicle, upon detection of idling operation of the engine, while the other type is adapted to actuate the braking system or to establish a high-speed gear train and a low-speed gear train at the same time so as to generate to braking force by the so-called internal lock of the transmission upon detection of idling operation of the engine. It is generally considered that the former type is more advantageous in respect of fuel consumption and is less dangerous when it is misoperated.

However, according to the former type, in starting the vehicle, it is required to release the transmission from the neutral position so as to permit the frictionally engaging device, e.g. the starting or first-speed clutch, to promptly operate without delay. In order to ensure good responsiveness of the starting clutch to the starting operation of the vehicle, it is known to be effective to increase and hold the operating pressure of the starting clutch to and at a value which does not cause substantial engagement of the clutch. That is, the clutch operating pressure should be previously increased to and held at a pressure (hereinafter referred to as "the holding pressure Po") slightly lower than the minimum pressure (hereinafter referred to as "the engaging pressure Pe") at and above which the clutch becomes engaged, so as to bring the starting clutch from a creep-inhibiting state to a creep-permitting state with good responsiveness.

The holding pressure Po should desirably be set at a value as close as possible to the engaging pressure Pe. However, in practice, if the holding pressure Po is set at such a value very close to the engaging pressure Pe, the frictionally engaging elements of the clutch such as clutch facings can be forcibly held in sliding contact with each other while the clutch is in a creep-inhibiting state, due to machining errors and assembling errors of the clutch. If the clutch is kept in a creep-inhibiting state for a long period of time, the frictionally contacting clutch plates will generate heat, resulting in early waar of the clutch plates.

SUMMARY OF THE INVENTION

It is an object of the invention to provide a frictionally engaging device which has a simple cooling means for effectively cooling the frictionally engaging elements thereof while it is in a creep-inhibiting state, to thereby have a prolonged life.

It is another object of the invention to provide a frictionally engaging device in which the holding pressure Po slightly lower than the engaging pressure Pe to and at which the clutch operating pressure is increased and held while the device is in a creep-inhibiting state, is given a large tolerance, to thereby facilitate control of tolerances in machining and assemblage of component parts of the device, and thus reduce the manufacturing cost.

The invention provides a frictionally engaging device for power transmission of an automotive vehicle, comprising: frictionally engaging elements; a hydraulically operated piston for urging the frictionally engaging elements into engagement with each other; a first pressure chamber defined in part by the piston at one side thereof; a second pressure chamber defined in part by the piston at another side of thereof and accommodating the frictionally engaging elements; an operating fluid pressure source for supplying the first pressure chamber with an operating fluid pressure acting upon the piston to bias same in a direction of engaging the frictionally engaging elements with each other; spring means acting upon the piston to bias same in a direction of disengaging the frictionally engaging elements from each other; hydraulic pressure control means interposed between the operating fluid pressure source and the first pressure chamber, for controlling the operating fluid pressure supplied from the operating fluid pressure source at least to a value higher than a first predetermined value which causes engagement of the frictionally engaging elements and to a second predetermined value lower than the first predetermined value, which causes disengagement of the frictionally engaging elements to inhibit creeping of the frictionally engaging elements; first valve means adapted to open when the operating fluid pressure within the first pressure chamber is lower than the second predetermined value to allow escape of the operating fluid from the second pressure chamber to the first pressure chamber; and second valve means adapted to open when the operating fluid pressure within the first pressure chamber is at least lower than the first predetermined value to permit flow of the operating fluid from the first pressure chamber to the second pressure chamber, whereby the frictionally engaging elements are cooled by the flowing operating fluid.

The above and other objects, features and advantages of the invention will be more apparent from the ensuing detailed description taken in conjunction with the accompanying drawings.

BRIEF DESCRIPTION OF THE DRAWINGS

FIGS. 2, 2A and 2B are a circuit diagram illustrating a hydraulic control system including the frictionally engaging device according to the invention, employed in the automatic gear transmission of FIG. 1;

DETAILED DESCRIPTION

The invention will now be described in detail with reference to the drawings showing an embodiment thereof.

Figure 1:
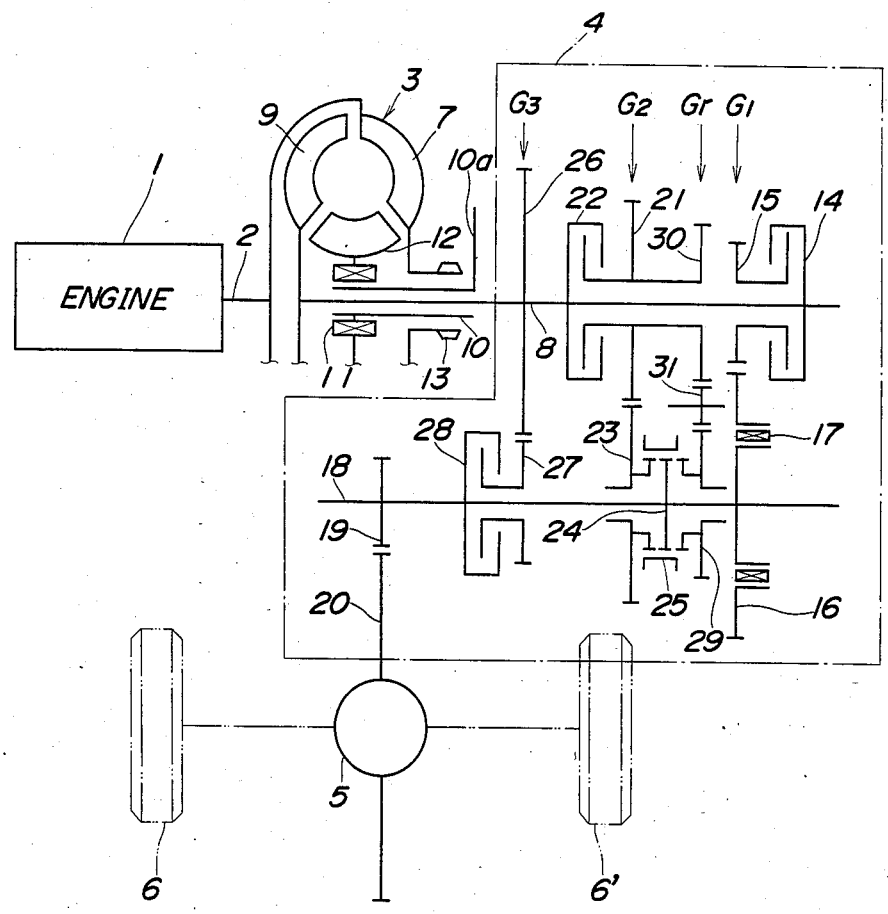
FIG. 1 is a schematic view of an automatic gear transmission for automotive vehicles, to which is applied a frictionally engaging device according to the invention.

Referring first to FIG. 1, there is schematically illustrated an automatic gear transmission for automotive vehicles having three forward speed reduction gears and one reverse gear, to which the invention is applied. Output from an engine 1 is transmitted to driving wheels 6 and 6' for driving same through a crankshaft 2 of the engine, a torque converter 3 as a fluid coupling, a gear transmission 4, and a differential 5 in the mentioned order.

The torque converter 3 comprises a pump 7 coupled to the crankshaft 2, a turbine 9 coupled to an input shaft 8 of the gear transmission 4, and a stator 12 coupled, via a one-way clutch 11, to a stator shaft 10 which in turn is supported on the input shaft 8 for rotation relative thereto. Torque is transmitted from the crankshaft 2 to the pump 7, and then to the turbine 9 in a hydrodynamic manner. When amplification of torque takes place while torque is transmitted from the pump 7 to the turbine 9, the resulting reaction force is borne by the stator 12, as is known.

Figure 2A:
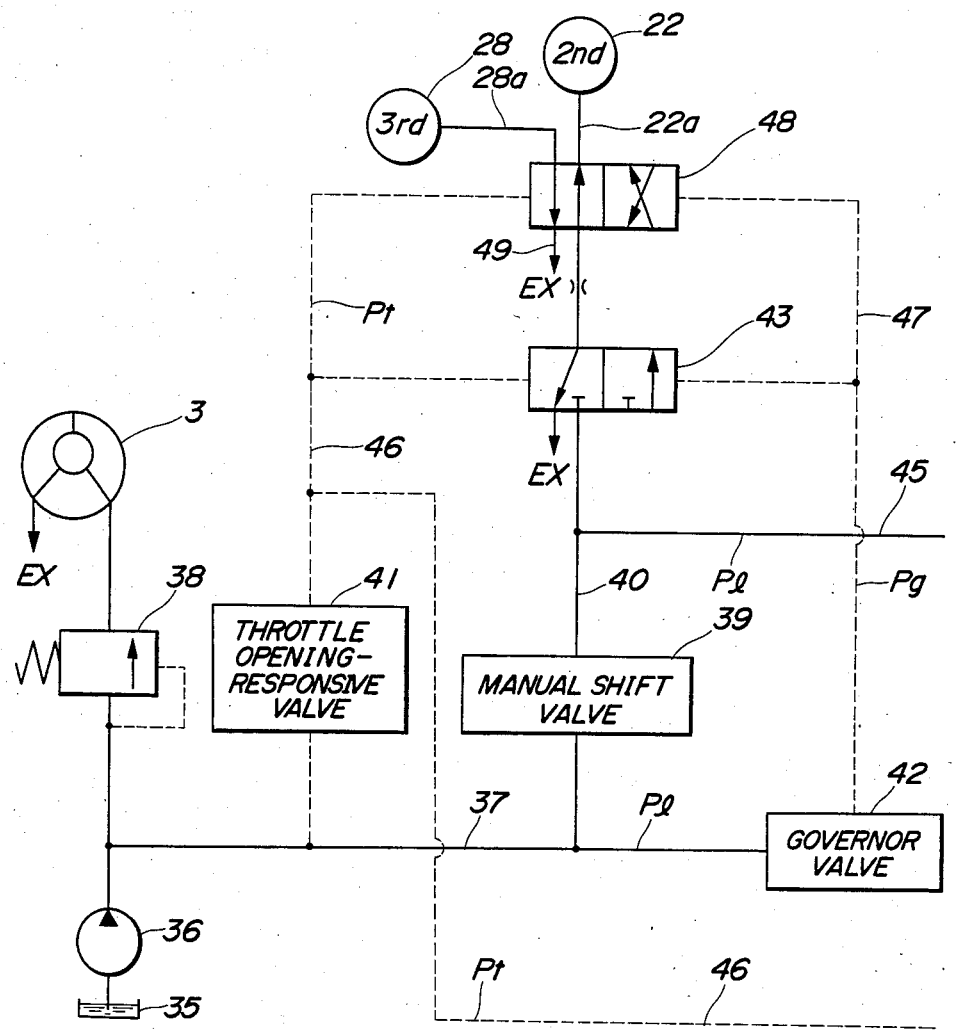

A pump driving gear 13 is arranged on a right end of the pump 7 as viewed in FIG. 1, for driving an oil hydraulic pump 36 appearing in FIG. 2. A stator arm 10a is secured to a right end of the stator shaft 10 for controlling a regulator valve 38 appearing in FIG. 2.

The gear transmission 4 has an output shaft 18 extending parallel with the input shaft 8, and is provided with a lowest-speed or first-speed gear train G1, a second-speed gear train G2, a highest speed or third-speed gear train G3, and a reverse gear train Gr, all arranged in juxtaposition between the input and output shafts 8, 18. The first-speed gear train G1 comprises a driving gear 15 connectible to the input shaft 8 through a first-speed clutch 14, and a driven gear 16 connectible to the output shaft 18 through a one-way clutch 17 and engaging with the driving gear 15.

The second-speed gear train G2 comprises a driving gear 21 connectible to the input shaft 8 through a second-speed clutch 22, and a driven gear 23 engaging with the driving gear 21, a reverse hub 24 secured to the output shaft 18, and a reverse selector 25 shiftable to selectively connect the reverse hub 24 to the driven gear 23 or to a driven gear 29 of the reverse gear grain Gr, hereinafter described.

The third-speed gear train G3 comprises a driving gear 26 secured to the input shaft 8, and a driven gear 27 connectible to the output shaft 18 through a third-speed clutch 28 and engaging with the driving gear 26.

On the other hand, the reverse gear train Gr comprises a driving gear 30 formed integrally with the driving gear 21 of the second-speed gear train G2, an idle gear 31 engaging with the driving gear 30, and the driven gear 29 engaging with the idle gear 31 and connectible to the reverse hub 24 through the reverse selector 25.

The reverse selector 25 is arranged between the driven gears 23 and 29, and shiftable between a left or forward position and a right or reverse position as viewed in FIG. 1, to selectively connect the driven gear 23 or 29 to the output shaft 18. The one-way clutch 17 only permits the driving torque from the engine 1 to be transmitted to the driving wheels 6, 6', while prohibiting transmission of torque from the driving wheels 6, 6' to the engine 1.

If the first-speed clutch 14 alone is engaged while the reverse selector 25 is held in the forward position as illustrated in FIG. 1, the driving gear 15 is connected to the input shaft 8 to establish the first-speed gear train G1, thereby allowing transmission of torque from the input shaft 8 to the output shaft 18 therethrough. Then, if the second-speed clutch 22 is engaged with the first-speed clutch 14 maintained in its engaged state, the driving gear 21 is connected to the input shaft 8 to establish the second-speed gear train G2 through which the torque can be transmitted from the input shaft 8 to the output shaft 18. That is, even while the first-speed clutch 14 is engaged, the second-speed gear train G2 can be established by the action of the one-way clutch 17, rendering the first-speed gear train G1 substantially inoperative.

Similarly, even while the first-speed clutch 14 is engaged, the third-speed gear train G3 can be established by the action of the one-way clutch 17, rendering the first-speed gear grain G1 substantially inoperative. That is, if the second-speed clutch 22 is disengaged and the third-speed clutch 28 is engaged instead, the driven gear 27 is connected to the output shaft 18 to establish the third-speed gear train G3.

On the other hand, if the second-speed clutch 22 alone is engaged while the reverse selector 25 is shifted to the right or reverse position, the driving gear 30 and the driven gear 29 are connected, respectively, to the input shaft 8 and the output shaft 18 to establish the reverse gear train Gr, thereby allowing transmission of torque from the input shaft 8 to the output shaft 18 through the reverse gear train Gr.

The torque transmitted to the output shaft 18 is then transmitted through an output gear 19 mounted on one end of the output shaft 18 to an enlarged gear 20 of the differential 5.

Referring now to FIG. 2 schematically illustrating a hydraulic control system of the automatic transmission having a creep-inhibiting device, to which is applied a frictionally engaging device according to the invention, the oil hydraulic pump 36 sucks operating oil from an oil tank 35 for pressure delivery of same to a fluid line 37. Having been regulated to a predetermined pressure value by the regulator valve 38 controlled by the stator arm 10a, the pressurized oil is delivered in part to the interior of the torque converter 3, to increase the internal pressure of the torque converter 3 in response to load on the torque converter 3 for prevention of cavitation therein. The pressurized oil from the pump 36 has its pressure regulated to a predetermined value (hereinafter called "the line pressure Pl") by the regulator valve 38, and is then delivered to a throttle opening-responsive valve 41, a manual shift valve 39, and a governor valve 42.

As is already known, the throttle opening-responsive valve 41 generates a throttle pressure Pt corresponding to the stepping amount of an accelerator pedal, not shown, of the engine 1, i.e. the valve opening of a throttle valve, not shown, arranged in the intake system of the engine 1, and supplies same to a pilot fluid line 46. On the other hand, the governor valve 42 also of a known type is rotatively driven by the output shaft 18 of the transmission 4 or the enlarged gear 20 of the differential 5, to generate a governor pressure Pg variable in response to the vehicle speed and supply same to a pilot fluid line 47. The throttle pressure Pt and the governor pressure Pg are supplied to a 1-2 speed shift valve 43 and a 2-3 speed shift valve 48 to act upon respective end faces of the valve bodies of the shift valves 43 and 48, to thereby control the position of the valve bodies.

The line pressure Pl supplied from the fluid line 37 to the fluid line 40 through the manual shift valve 39 is selectively supplied to the first-speed, second-speed, third-speed clutches 14, 22, 28, and an actuator, not shown, of the reverse selector 25, in a manner depending upon the shifting actions of the 1-2 shift valve 43 and the 2-3 shift valve 48 responsive to the throttle pressure Pt and the governor pressure Pg. In general, at the start of the vehicle, the line pressure Pl in the fluid line 40 is solely supplied to the first-speed clutch 14 as the frictionally engaging device for starting the vehicle, through a fluid line 45, a valve 52 as the creep-inhibiting device, hereinafter described, and a fluid line 14a to establish the first-speed gear train Gl alone.

As the vehicle speed increases to a predetermined value, the governer pressure Pg increases correspondingly to cause shift of the 1-2 shift valve 43 so that the line pressure Pl is not only supplied to the first-speed clutch 14 but also to the second-speed clutch 22 through the 1-2 shift valve 43, the 2-3 shift valve 48, and a fluid line 22a, to establish the second-speed gear train G2. When the vehicle speed further increases, the 2-3 shift valve 48 is shifted so that the fluid pressure within the second-speed clutch 22 is drained through the drain line 49, while simultaneously the line pressure Pl is supplied to the third-speed clutch 28, whereby the third-speed gear train G3 is established.

Since the arrangement of the automatic transmission described above is known in the art, further detailed explanation of which is omitted.

The creep-inhibiting valve 52 is connected between the fluid lines 45, 14a. The valve 52 has its valve body 53 of which an upper end face has a pressure-receiving surface area larger than that of a lower end face thereof. An axially central portion of the valve body 53 is reduced in diameter such that its outer peripheral surface is formed with an annular groove 62 in communication through a small hole 55 with a lower pressure chamber 61 defined in part by the lower end face of the valve body 53. The upper end face of the valve body 53 defines part of an upper pressure chamber 60 in which is arranged a spring 58 permanently urging the valve body 53 downward as viewed in FIG. 2. The spring 58 abuts at its upper end against an adjusting screw 65 so that by axially displacing the screw 65, the force of the spring 58 can be set at a desired value. Reference numeral 65a denotes a lock nut for fixing the adjusting screw 65 in a desired position, and 65b a cover which is removable from the valve 52 and provided for protecting the adjusting screw 65.

A bypass fluid line 69 branches off from the input fluid line 45 of the creep-inhibiting valve 52 and permanently communicates with the output fluid line 14a of the same valve 52 through a filter 64 and a restriction 54. The upper pressure chamber 60 of the creep-inhibiting valve 52 permanently communicates with an output fluid line 59 of a selector valve 70, hereinafter referred to. A feedback fluid line 67 branches off from the output fluid line 14a and is disposed to be communicated with a drain line 63 of the creep-inhibiting valve 52 through an electromagnetic valve 56 and a fluid line 66. The communication between the feedback fluid line 67 and the drain line 63 is selectively established and blocked by the valve body 53 of the creep-inhibiting valve 52.

The electromagnetic valve 56 has a solenoid, not shown, one end of which is electrically connected via a line 81 to a power supply source, not shown, and the other end is grounded through a power transistor 82. The base of the transistor 82 is connected via an AND circuit to an engine rotational speed sensor 83 and a vehicle speed sensor 84. The engine rotational speed sensor 83 is adapted to generate a signal having a high level when the rotational speed of the engine is smaller than a predetermined value, while the vehicle speed sensor 84 is adapted to generate a signal having a high level when the vehicle speed is smaller than a predetermined value. The sensor 84 may comprise a magnet which may be driven by a speedometer cable, and a reed switch.

When the engine rotational speed is smaller than the predetermined value and at the same time the vehicle speed is lower than the predetermined value, the output of the AND circuit 80 goes high to cause the transistor 82 to conduct, whereby the solenoid of the electro-magnetic valve 56 is energized to displace its valve body 57 to an upper or open position as illustrated. On the other hand, when either one of these engine speed and vehicle speed conditions is not fulfilled, the solenoid of the electromagnetic valve 56 is deenergized and accordingly its valve body 57 assumes a lower or closed position.

The selector valve 70 has its valve body 71 always urged leftward as viewed in FIG. 2, by a spring 72 accommodated in a spring chamber 77 which is defined in part by a right end face of the valve body 71 and connected to a drain line 78, while a pressure chamber 76 is defined in part by a left end face of the valve body 71 and connected via a parallel circuit formed by a restriction 73 and a check valve 74, to the fluid line 46 which delivers the throttle pressure Pt. An axially central portion of the valve body 71 is reduced in diameter such that its outer peripheral surface is formed with an annular groove 71a.

When the throttle pressure Pt in the fluid line 46 is substantially zero, the valve body 71 of the selector valve 70 is maintained in the left position by the urging force of the spring 72, to fully communicate the fluid line 46 with the output fluid line 59 through the annular groove 71a and the fluid line 79.

When the throttle valve is opened to increase the throttle pressure Pt in the fluid line 46 above a predetermined pressure, the throttle pressure Pt thus increased is introduced into the pressure chamber 76 of the selector valve 70 through the check value 74, so that the valve body 71 is shifted to a rightward position, against the force of the spring 72. Therefore, the throttle pressure Pt is introduced into the fluid line 59 through the fluid line 46 and the check valve 75, and at the same time, the line pressure Pl in the fluid line 45 is now supplied to the fluid line 59 through the annular groove 71a of the selector valve 70. The line pressure Pl supplied from the fluid line 45 is higher than the throttle pressure Pt supplied from the fluid line 46 and accordingly the check valve 75 is closed by the line pressure Pl, whereby the pilot pressure Pl is supplied to the fluid line 59, with almost no loss in the line pressure Pl.

That is, the selector valve 70 operates in response to the throttle pressure Pt supplied thereto as a pilot signal from the fluid line 46 to output the line pressure Pl to the fluid line 59 when the throttle pressure Pt increases above the predetermined pressure.

When the throttle pressure Pt in the fluid line 46 is again reduced to substantially zero, the fluid within the pressure chamber 76 is gradually drained through the restriction 73 alone, and accordingly the valve body 71 of the selector valve 70 gradually returns to the left position, to finally interrupt the communication between the fluid line 45 and the output fluid line 59.

The creep-inhibiting valve 52 constructed as above operates as follows:

When the engine rotational speed is lower than its predetermined value and at the same time vehicle speed is lower than its predetermined value, that is, when the vehicle is in a condition wherein creeping should be inhibited, the electromagnetic valve 56 is in an energized state with its valve body 57 biased to the upper or open position. If, on this occasion, the throttle pressure Pt in the fluid line 46 is substantially zero, the valve body 71 of the selector valve 70 is maintained in the left position by the urging force of the spring 72, to fully communicate the fluid line 46 with the fluid line 59 through the annular groove 71a. Accordingly, the pressure in the upper pressure chamber 60 of the creep-inhibiting valve 52 is low. On the other hand, the line pressure Pl is introduced from the fluid line 45 directly and/or through the fluid line 69 provided with the restriction 54, to the lower pressure chamber 61 to act upon the lower end face of the valve body 53, whereby the valve body 53 is displaced upward. When the valve body 53 is displaced upward through a certain stroke, the fluid line 66 connected to the fluid line 14a becomes communicated with the drain line 63, and the input fluid line 45 is then blocked by the valve body 53. Since the line pressure Pl acting upon the lower end face of the valve body 53 is supplied there solely through the restriction 54 of the fluid line 69, the annular groove 62 and the small hole 55, the valve body 53 is held in an equilibrated position as shown in FIG. 2.

More specifically, if the valve body 53 moves upward from the FIG. 2 position, the operating oil in the annular groove 62 escapes through the fluid lines 67, 66 and the drain line 63 so that the pressure drops in the annular groove 62 as well as in the lower pressure chamber 61. Accordingly, the valve body 153 is displaced downward to resume the equilibrated position shown of FIG. 2.

On the other hand, when the valve body 53 assumes a position downward of the FIG. 2 position, the line pressure Pl is directly supplied from the fluid line 45 to the annular groove 62 so that the pressure promptly increases in the annular groove 62 and the lower pressure chamber 61, whereby the valve body 53 is again brought into the equilibrated position shown in FIG. 2. The clutch pressure P in the fluid line 14a is thus maintained at Po by the valve 52, which is not high enough to cause engagement of the first-speed clutch 14. Therefore, the clutch 14 is maintained in a disengaged state to prevent creeping of the vehicle.

This holding pressure valve Po is determined by the pressure-receiving surface area of the lower end face of the valve body 53, the cross-sectional area of the restriction 54, the line pressure Pl, the force of the spring 58, etc., and can be adjusted to a higher value by axially inwardly displacing the adjusting screw 65 to further compress the spring 58, and to a lower value by axially outwardly displacing the screw 65 to reduce the urging force of the spring 58.

When the throttle valve is opened to increase the throttle pressure Pt in the fluid line 46 above the predetermined value, the line pressure Pl is supplied from the fluid line 45 to the fluid line 59 through the selector valve 70, as stated before. The line pressure Pl thus supplied to the fluid line 59 is then introduced into the upper pressure chamber 60 via the port 68 so that the valve body 53 is promptly displaced downward due to the difference in pressure-receiving surface area between the upper and lower end faces of the valve body 53, as well as the force of the spring 58, to thereby fully communicate the input fluid line 45 with the output fluid line 14a to bring the first-speed clutch 14 into a creep-permitting state.

Now, let it be assumed that the electromagnetic valve 56 is deenergized with its valve body 57 shifted to the lower or closed position.

When the throttle pressure Pt in the fluid line 46 is substantially zero and accordingly the pressure in the fluid line 59 is low, the line pressure Pl in the input fluid line 45 is supplied directly and/or through the bypass fluid line 69 to the creep-inhibiting valve 52, and then introduced into the lower pressure chamber 61 through the annular groove 62 and the small hole 55, so that the line pressure Pl acts upon the valve body 53 at its lower end face to bias same upward into the FIG. 2 position. With the valve body 53 held in this position, the input fluid line 45 is blocked by the valve body 53 and therefore the line pressure Pl is supplied to the lower pressure chamber 61 solely through the restriction 54 of the bypass fluid line 69, the annular groove 62 and the small hole 55. However, since the pressurized oil in the fluid line 14a cannot be drained through the fluid line 67 which is then blocked by the valve body 57, the first-speed clutch 14 is supplied with the line pressure Pl higher than the engaging pressure Pe and therefore brought into a creep-permitting state.

When the throttle pressure Pt in the fluid line 46 increases above the predetermined pressure, the line pressure Pl is now supplied through the fluid line 59 and the port 68 to the upper pressure chamber 60 as stated before. Accordingly, the valve body 53 is promptly displaced downward due to the difference in pressure-receiving surface between the upper and lower end faces of the valve body 53, as well as the force of the spring 58. On this occasion, the input fluid line 45 still communicates with the output fluid line 14a to continually hold the first-speed clutch 14 in the creep-permitting state.

Now, let it be assumed that while the first-speed clutch 14 is in a creep-inhibiting state, the accelerator pedal is gradually stepped on so as to bring the first-speed clutch 14 into a creep-permitting state. While the clutch 14 is in a creep-inhibiting state, the valve body 53 of the creep-inhibiting valve 52 is in the upper position, with the electromagnetic valve 56 energized to maintain communication between the fluid lines 66 and 67. Therefore, at an initial stage when the accelerator pedal has just been stepped on by a small amount, the increased throttle pressure Pt is introduced into the upper pressure chamber 60 through the fluid line 59. Then, the fluid pressure supplied to the fluid line 14a gradually increases in response to an increase in the stepping amount of the accelerator pedal to a value above the engaging pressure Pe, whereby a creep-permitting state of the first-speed clutch 14 is gradually recovered.

However, if the accelerator pedal is further stepped on above a certain amount, the line pressure Pl is promptly introduced into the upper pressure chamber 60 through the selector valve 70 and the port 68 as stated before, so that the valve body 53 promptly moves downward in response to the stepping-up speed of the accelerator pedal, to thereby promptly increase the pressure in the fluid line 14a.

On the other hand, let it now be assumed that the accelerator pedal is stepped on to increase the throttle pressure Pt while the electromagnetic valve 56 is maintained in an energized state. At an initial stage when the accelerator pedal has just been stepped on by a small amount, the pressure in the upper pressure chamber 60 of the creep-inhibiting valve 52 is increased in proportion to an increase in the valve opening of the throttle valve to gradually increase the clutch pressure P of the first-speed clutch 14 due to the action of the selector valve 70, and then finally increased to a value equal to the line pressure Pl, whereby smooth starting of the vehicle is ensured. On the other hand, when the throttle valve is suddenly opened for rapid starting of the vehicle, the line pressure Pl directly acts upon the valve body 53 of the creep-inhibiting valve 52 to displace same downward, whereby the first-speed clutch 14 promptly recovers a creep-permitting state, ensuring good responsiveness of the creep-inhibiting device to prompt vehicle starting operation by the driver.

On the other hand, when the accelerator pedal is suddenly released from its stepped-on position, it is desired to gradually bring the first-speed clutch 14 into a creep-permitting state since if it is abruptly brought into a creep-permitting state immediately after a release of the accelerator pedal, reverse torque can be transmitted from the driving wheels to the engine to shift the engine and the transmission from their mounted positions, resulting in a large shock. In order to avoid this, the fluid pressure in the pressure chamber 76 of the selector valve 70 is gradually drained to the fluid line 46 via the restriction 73 alone, so as to allow the valve body 71 to be gradually displaced leftward until finally the communication between the fluid lines 45 and 59 is blocked by the valve body 71, thereby preventing a shock from taking place upon abrupt recovering of a creep-inhibiting state of the first-speed clutch 14, through the action of the selector valve 70.

As stated above, the first-speed clutch 14 promptly recovers a creep-permitting state by virtue of the creep-inhibiting valve 52 which is adapted to maintain the clutch pressure P of the first-speed clutch 14 at the holding pressure Po slightly lower than the pressure Pe which causes engagement of the first-speed clutch 14, while the clutch 14 is in a creep-inhibiting state.

However, since the holding pressure Po is always supplied to a high pressure chamber 85 of the clutch 14 while it is in a creep-inhibiting state, clutch facings 88a and 88b as the frictionally engaging elements of the clutch 14 are held in sliding contact with each other to generate heat while the first-spaced clutch 14 is in a creep-inhibiting state, although the clutch 14 is not in an engaged state.

Figure 3:
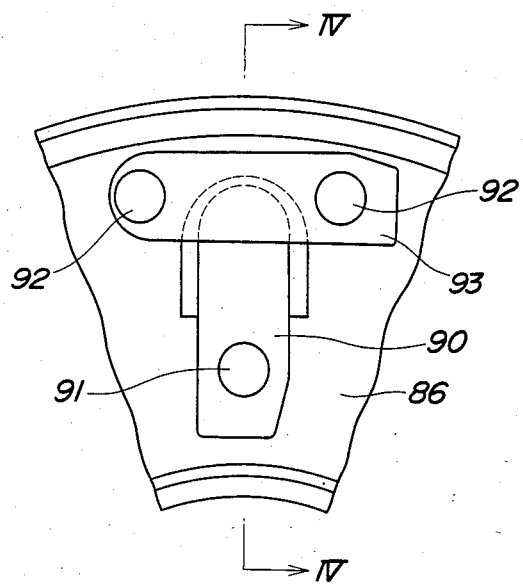
FIG. 3 is a front view illustrating a cooling valve provided in the frictionally engaging device according to the invention.
Figure 4:
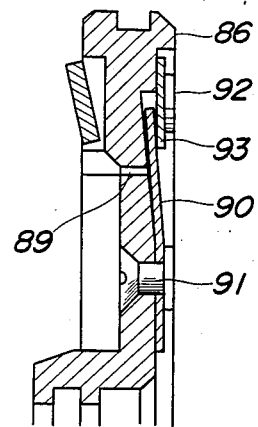
FIG. 4 is a longitudinal sectional view taken along line IV—IV in FIG. 3.

Therefore, according to the present invention, as shown in FIGS. 3 and 4, the first-speed clutch 14 has a servo piston 86 formed therein with a through hole 89 communicating between a low pressure chamber 87 accommodating the facings 88a, 88b and the high pressure chamber 85 into which is introduced the operating fluid pressure for driving the servo piston 86. A spring 99 is arranged in the chamber 87 and urges the servo piston 86 in a direction of disengaging the facings 88a, 88b from each other. A reed valve 90, as a cooling valve, is mounted on an end face of the servo piston 86 by a rivet 91, in a manner opening and closing one end of the through hole 89 opening into the high pressure chamber 85. The reed valve 90 warps away from the through hole 89 due to its own resilience to open same when no pressure is applied on the valve. When the internal pressure of the high pressure chamber 85 or the operating fluid pressure increases to a value above the engaging pressure Pe, preferably to a value slightly higher than the engaging pressure Pe, the valve 90 is deformed by the increased pressure to close the through hole 89. A stopper plate 93 is fixed to the end face of the servo piston 86 by two revets 92 to limit the maximum opening degree of the reed valve 90 so as to maintain the opening area of the one end of the through hole 89 at a minimum required value.

Figure 5:
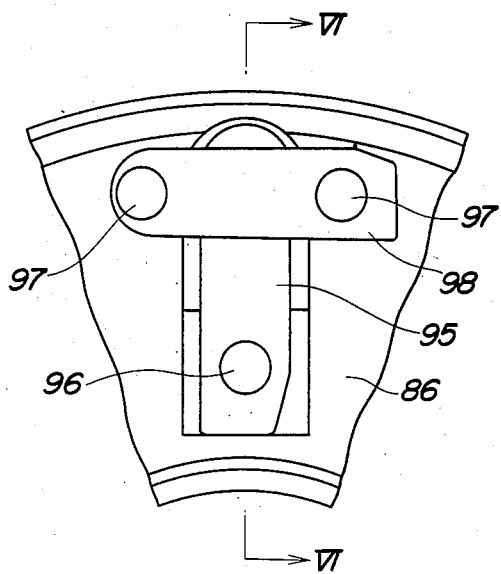
FIG. 5 is a view of a known drain valve arranged on a servo piston of the frictionally engaging device according to the invention at a circumferential location of the servo piston different from the cooling valve appearing in FIGS. 3 and 4.
Figure 6:
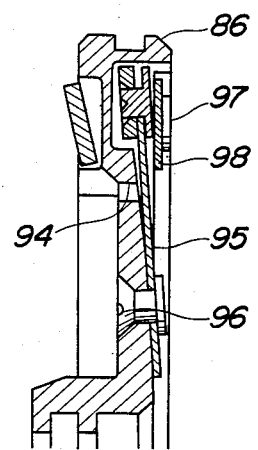
FIG. 6 is a longitudinal sectional view taken along line VI—VI in FIG. 5.

FIGS. 5 and 6 show a drain valve of a known type, which is provided on the servo piston 86 at a different circumferential location from the cooling valve 90 in FIG. 4. As shown in FIGS. 5 and 6, the servo piston 86 is formed with another through hole 94 having a cross-sectional sectional area substantially larger than that of the through hole 89. A reed valve 95 as the drain valve is mounted on the end face of the servo piston 86 by a rivet 96 and operable in response to the difference between its own resilience and the operating fluid pressure within the high pressure chamber 85, so as to open one end of the through hole 94 opening into the high pressure chamber 85 when the oil pressure within the high pressure chamber 85 is lower than the holding pressure Po. A stopper plate 98 is fixed to the end face of the servo piston 86 by two rivets 97 operates in the same way as the stopper 93. By virtue of the drain valve 95 constructed as above, the through hole 94 is opened to drain the pressure within the low pressure chamber 87 when the manual shift valve 39 is shifted to a position where the clutch pressure P of the first-speed clutch 14 should be completely reduced to zero.

The operation of the reed valve 90 as the cooling valve constructed as above will be described hereinbelow.

As stated before, when the creep-inhibiting valve 52 is in a position to inhibit the creeping of the vehicle, the clutch pressure P of the first-speed clutch 14 is maintained at the holding pressure Po which is slightly lower than the engaging pressure Pe. Since the resilience of the reed valve 90 is set at such a value that the reed valve 90 does not close when it is acted upon by a pressure equal to the holding pressure Po, part of the oil pressure within the high pressure chamber 85, i.e. the clutch pressure P, is permitted to flow into the low pressure chamber 87 accommodating the facings 88a, 88b through the through hole to cool the facings 88a, 88b, while the first-speed clutch 14 is in a creep-inhibiting state. Therefore, even when the clutch pressure P temporarily drops below the engaging pressure Pe to cause generation of frictional heat by the facings 88a, 88b, the facings 88a, 88b are effectively cooled, thereby prolonging the life of the facings to a great extent. On the other hand, when the first-speed clutch 14 recovers a creep-permitting state, that is, the clutch pressure P is increased to a value equal to or above the engaging pressure Pe to transmit the engine torque to the driving wheels, the reed valve 90 closes the through hole 89, so as to prevent unnecessary leakage of the operating oil from the high pressure chamber 85.

Although in the foregoing embodiment, the cooling valve is formed of a reed valve arranged on the servo piston, this is not limitative, but the cooling valve may be formed of a valve of any other type located at any other suitable position for communicating the high pressure chamber with the low pressure chamber.

Further, although in the foregoing embodiment, the frictionally engaging device of the present invention is applied to an automatic transmission having a torque converter as a fluid coupling, this is not limitative, but it may be applied to automatic transmissions having suitable fluid couplings of other types. Still further, the gear transmission to which the device according to the invention is applied may be a suitable mechanical transmission of any other type.

What is claimed is:

1. A frictionally engaging device for power transmission of an automotive vehicle, comprising:

frictionally engaging elements;

a hydraulically operated piston for urging said frictionally engaging elements into engagement with each other;

a first pressure chamber defined in part by said piston at one side of said piston;

a second pressure chamber defined in part by said piston at another side thereof and accommodating said frictionally engaging elements;

an operating fluid pressure source for supplying said first pressure chamber with an operating fluid pressure acting upon said piston to bias same in a direction of engaging said frictionally engaging elements with each other;

spring means acting upon said piston to bias same in a direction of disengaging said frictionally engaging elements from each other;

hydraulic pressure control means interposed between said operating fluid pressure source and said first pressure chamber, for controlling said operating fluid pressure supplied from said operating fluid pressure source at least to a value higher than a first predetermined value which causes engagement of said frictionally engaging elements and to a second predetermined value slightly lower than said first predetermined value, which causes disengagement of said frictionally engaging elements to inhibit creeping of said frictionally engaging elements;

first valve means having a first through hole formed in said piston for allowing escape of operating fluid from said second pressure chamber to said first pressure chamber, and a valve body adapted to open and close said first through hole, said first valve means being adapted to open when said operating fluid pressure within said first pressure chamber is lower than said second predetermined value to allow escape of said operating fluid from said second pressure chamber to said first pressure chamber; and second valve means having a second through hole formed in said piston, and a valve body arranged on a side surface of said piston at said one side thereof to open and close said second through hole, the opening area of said second through hole of said second valve means being smaller than the opening area of said first through hole of said first valve means, said second valve means being adapted to open when operating fluid pressure within said first pressure chamber is equal to or lower than said first predetermined value, said second valve means being adapted to open to such a degree that an operating fluid pressure within said first pressure chamber can be maintained at said second predetermined value so long as said operating fluid pressure within said first pressure chamber is lower than said first predetermined value to permit flow of said operating fluid from said first pressure chamber to said second pressure chamber, so that said frictionally engaging elements are cooled by said flowing operating fluid.

2. A frictionally engaging device as claimed in claim 1, wherein said valve body of said second valve means comprises a reed valve.

* * * * *

UNITED STATES PATENT AND TRADEMARK OFFICE
CERTIFICATE OF CORRECTION

PATENT NO. : 4,696,383
DATED : September 29, 1987
INVENTOR(S) : Takashi Aoki, Yukihiro Fukuda and Masao Nishikawa It is certified that error appears in the above-identified patent and that said Letters Patent is hereby corrected as shown below:

On the cover page, Item [30] Foreign Application Priority Data, add a foreign application to read as follows:

July 13, 1984 [JP] Japan............59-106224

Signed and Sealed this

Twelfth Day of April, 1988

Attest:

DONALD J. QUIGG

*Attesting Officer*          Commissioner of Patents and Trademarks